United States Patent [19]

O'Brien

[11] Patent Number: 5,097,109

[45] Date of Patent: Mar. 17, 1992

[54] INSULATED ALUMINUM WELD FIXTURE AND A METHOD OF MAKING SAME

[75] Inventor: Paul P. O'Brien, Flint, Mich.

[73] Assignee: General Motors Corporation, Detroit, Mich.

[21] Appl. No.: 481,266

[22] Filed: Feb. 20, 1990

[51] Int. Cl.$^5$ .................. B23K 11/10; B23K 37/04
[52] U.S. Cl. .................. 219/86.1; 219/86.9; 219/158
[58] Field of Search .......... 219/86.1, 158, 86.9, 219/86.24, 86.25, 86.31, 87; 148/285; 228/6.1, 6.2, 118; 29/527.4; 427/327, 388.1, 399, 409, 419.2; 204/33, 38.3, 58

[56] References Cited

U.S. PATENT DOCUMENTS

| | | | |
|---|---|---|---|
| 2,144,790 | 1/1939 | Beiderman | 219/87 |
| 2,464,839 | 3/1949 | Fairfield | 219/86.25 |
| 3,061,711 | 10/1962 | Gurtner | 219/86.31 |
| 3,125,668 | 3/1964 | Eisenburger et al. | 219/87 |
| 3,243,321 | 3/1966 | Rowand | 427/327 |
| 3,734,784 | 5/1973 | Bereday et al. | 427/327 |
| 4,089,756 | 5/1978 | Lerner et al. | 204/58 |
| 4,313,046 | 1/1982 | Henry et al. | 219/137.62 |
| 4,439,287 | 3/1984 | Birkle et al. | 204/58 |
| 4,606,796 | 8/1986 | Hanazima et al. | 204/58 |
| 4,701,013 | 10/1987 | Jurczyszyn et al. | 219/86.9 |
| 4,889,967 | 12/1989 | Iida et al. | 219/87 |

*Primary Examiner*—Geoffrey S. Evans
*Attorney, Agent, or Firm*—C. R. Meland

[57] ABSTRACT

A spot welding fixture for holding worpieces in correct orientation has a water cooled aluminum body processed to have an aluminum oxide coating. The coating electrically insulates the body but provides good thermal conductivity so that a fixed electrode on the fixture body can be cooled by the body but no electrical shorts occur. Locating elements on the fixture are likewise insulated to prevent weld current from straying from intended paths. The coating is formed by immersing the aluminum body in sulfuric acid at 23 degrees Fahrenheit after all features have been machined into the body.

8 Claims, 4 Drawing Sheets

INSULATED ALUMINUM WELD FIXTURE AND A METHOD OF MAKING SAME

FIELD OF THE INVENTION

This invention relates to a weld fixture and a method of making it and particularly to a weld fixture having good heat conductivity and electrical insulation qualities and a method for imparting electrical insulation to a thermally conductive fixture.

BACKGROUND OF THE INVENTION

In electric resistance welding or spot welding it is often required to use a fixture to hold sheet metal workpieces in the correct orientation for assembly. Generally such fixtures have a body made of a strong material which is heat conductive such as copper or steel and support a fixed copper electrode in contact with the workpiece. Movable electrodes engage the workpieces opposite the fixed electrode and apply welding current which passes from one movable electrode through the sheet metal to the fixed electrode and back through the sheet metal to the other movable electrode to form the welds. In some cases, the fixed electrode is coupled to the weld current source and the current flows in only one direction through the workpiece. The fixed electrode is thus subject to heat from the welded workpiece and is also directly heated by the current passing through it. To dissipate the heat it is important that the fixture act as a heat sink and it may be water cooled. It is also important that the electrode be electrically insulated from the fixture body. A separate insulator between the electrode and fixture body provides electrical insulation but reduces electrode cooling as well. Generally the fixed electrodes are short lived due to the high temperatures and are frequently replaced.

The fixtures also have various kinds of locators bolted to the fixture body to correctly position the workpieces for welding. The locators potentially provide current paths from the workpieces through the fixture to short the desired weld current path, thereby reducing the effective weld current and lowering the weld quality. The locators and fasteners are provided with various types of electrical insulators to isolate the sheet metal from the fixture body. This results in a multiplication of parts per fixture and causes difficulty in proper fixture design. The use of an electrical insulating material for the fixture is discouraged since electrical insulating materials are typified by low thermal conductivity.

SUMMARY OF THE INVENTION

It is therefore an object of the invention to provide a weld fixture which has good heat conduction properties and good electrical insulation. It is a further object to provide a weld fixture design which eliminates separate insulating parts. It is another object of the invention to provide a method of making such a weld fixture.

The invention is carried out by a weld fixture for locating sheet metal workpieces with respect to movable spot weld electrodes, comprising; a conductive fixture body having an electrically insulating and thermally conductive coating over its surface, a conductive stationary electrode attached to the body in intimate thermal contact with the body and electrically insulated from the body by the insulating coating, and a plurality of conductive fasteners attached to the body and insulated from the body by the insulating coating.

The invention is also carried out by the method of making a weld fixture having an electrode and workpiece locators comprising the steps of: machining a block of aluminum to a shape for holding a workpiece and an electrode, forming threaded apertures in the block for fasteners, then forming an aluminum oxide coating on all the block surfaces by immersing the block in sulfuric acid, assembling steel locators to the resultant insulated block by fasteners threaded into the apertures, and assembling an electrode to the insulated surface of the block.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
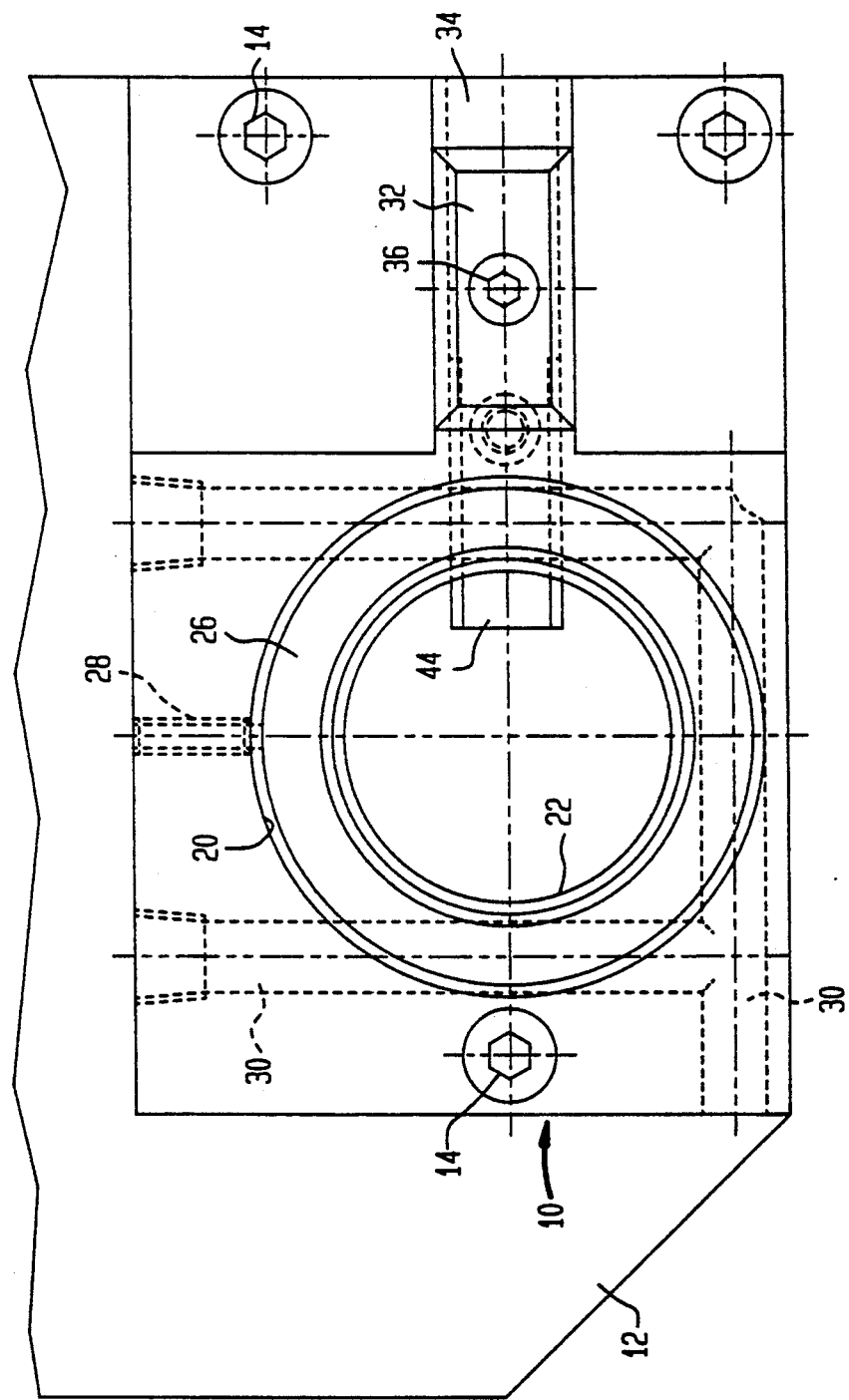
FIGS. 1 and 2 are top and elevational views, respectively, of a weld fixture according to the invention.
Figure 2:
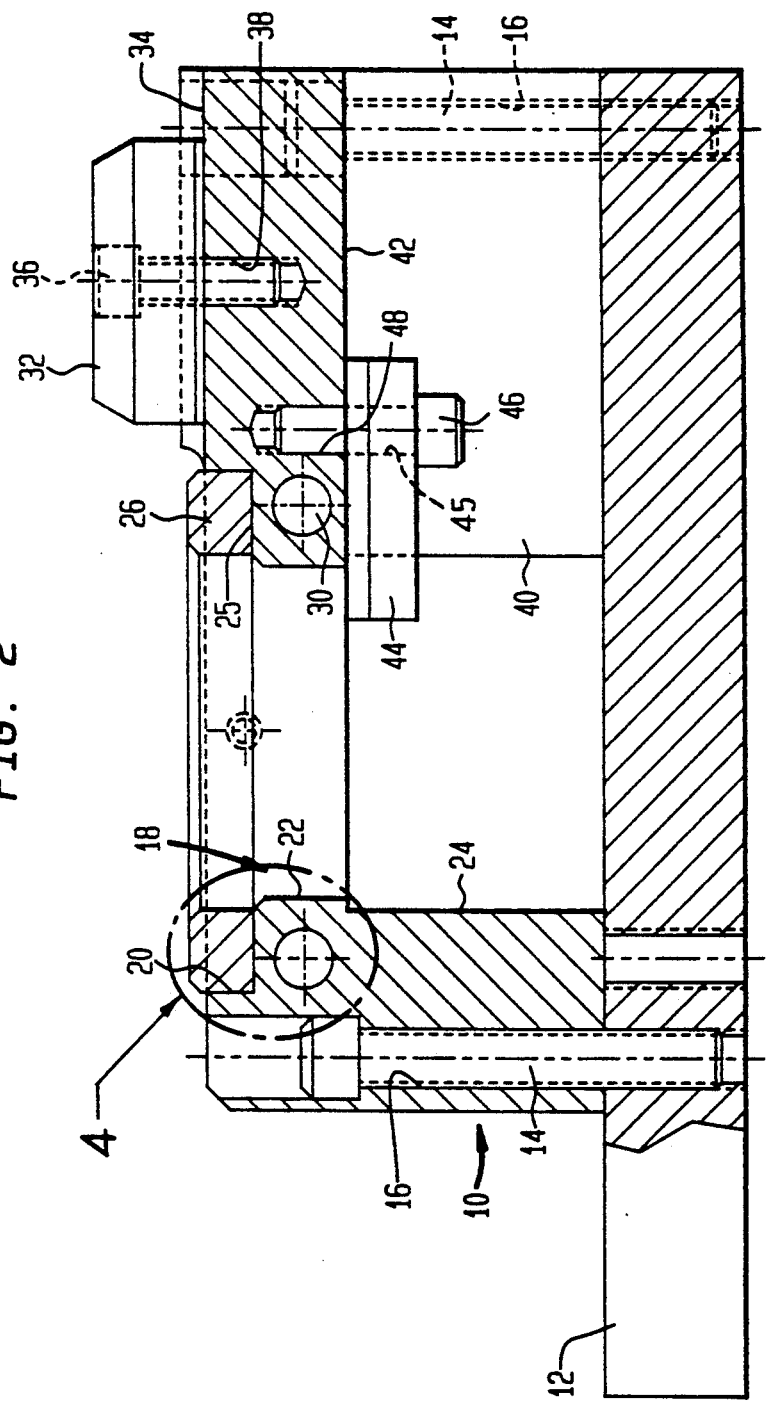

Referring to the drawings, a fixture body 10 comprising a generally rectangular aluminum block is fastened to a steel base plate 12 by bolts 14 extending through apertures 16 in the body. A stepped bore 18 in the body 10 has an upper portion 20 of largest diameter, an intermediate portion 22 of smallest diameter, and a lower portion 24 slightly larger than the intermediate portion 22. A flat shoulder 25 is defined between the bore portions 20 and 22. A toroidal fixed electrode 26 of copper alloy in the upper portion 20 of the bore 18 is seated on the shoulder 25 and has an inner diameter greater than that of the intermediate bore portion 22. The fixed electrode 26 is secured by a set screw 28 at one side. Water passages 30 in the block 10 surround the intermediate bore portion 22 just underneath the electrode 26. A rectangular locator element 32 with chamfered upper corners is seated in a groove 34 on top of the body 10 at one side of the electrode 26. A screw 36 threaded into a tapped aperture 38 in the body holds the locator element in place. A slot 40 in one end of the block underneath the groove 34 extends all the way to the lower bore portion 24 and has the same height as the lower bore portion. The slot 40 defines a lower surface 42 which supports a second rectangular locator element 44 having upper chamfered corners. A screw 46 threaded into a tapped aperture 48 in the body and extending through a hole 45 in the element 44 secures the element 44. An end of the locator element 44 protrudes into the lower bore portion 24 just adjacent to the intermediate bore portion 22. Both locator elements 32, 44 are preferably made of nonmagnetic stainless steel.

Figure 4:
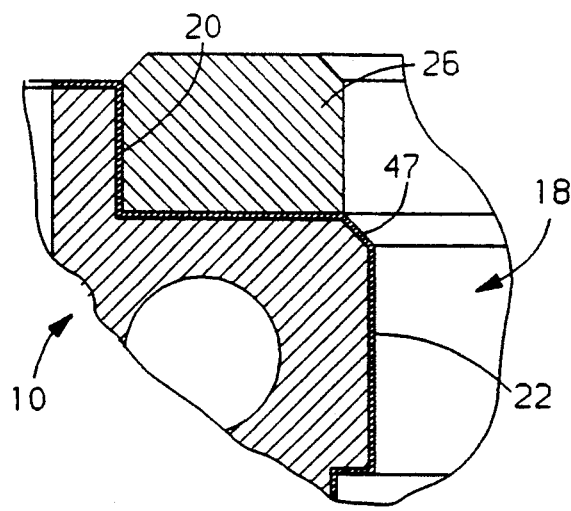
FIG. 4 is an enlarged sectional view of the encircled portion of FIG. 2 identified as 4.

To prevent weld current flow from the electrode 26 or the locators 32 and 44 or any other place which may contact the workpiece, the body 10 has an insulating coating 47 which is shown in the sectional view of FIG. 4. To form the coating on the body 10 including all the apertures, grooves and other features on the body, the body is oxidized after these features are machined. The locators 32, 44 and the fixed electrode 26 are fastened to the body 10 after the coating is formed and the body is then bolted to the base plate 12.

The process of oxidizing aluminum is well known for providing a hard surface on aluminum parts. The body 10 is immersed in concentrated sulfuric acid at 23 degrees Fahrenheit for several hours. The acid forms aluminum oxide crystals on the surface of the body to a depth of 0.002 inch. The oxide coating is porous and is impregnated to a depth of 0.0002 inch with polytetrafluoroethylene, also known as Teflon (TM), to seal the surface. The Teflon is not a coating but only fills the interstices between the oxide crystals near the surface. The oxide coating is not only an electrical insulator, it also conducts heat well and is very hard and abrasion resistant, thereby giving long life even under high volume manufacturing conditions.

Figure 3:
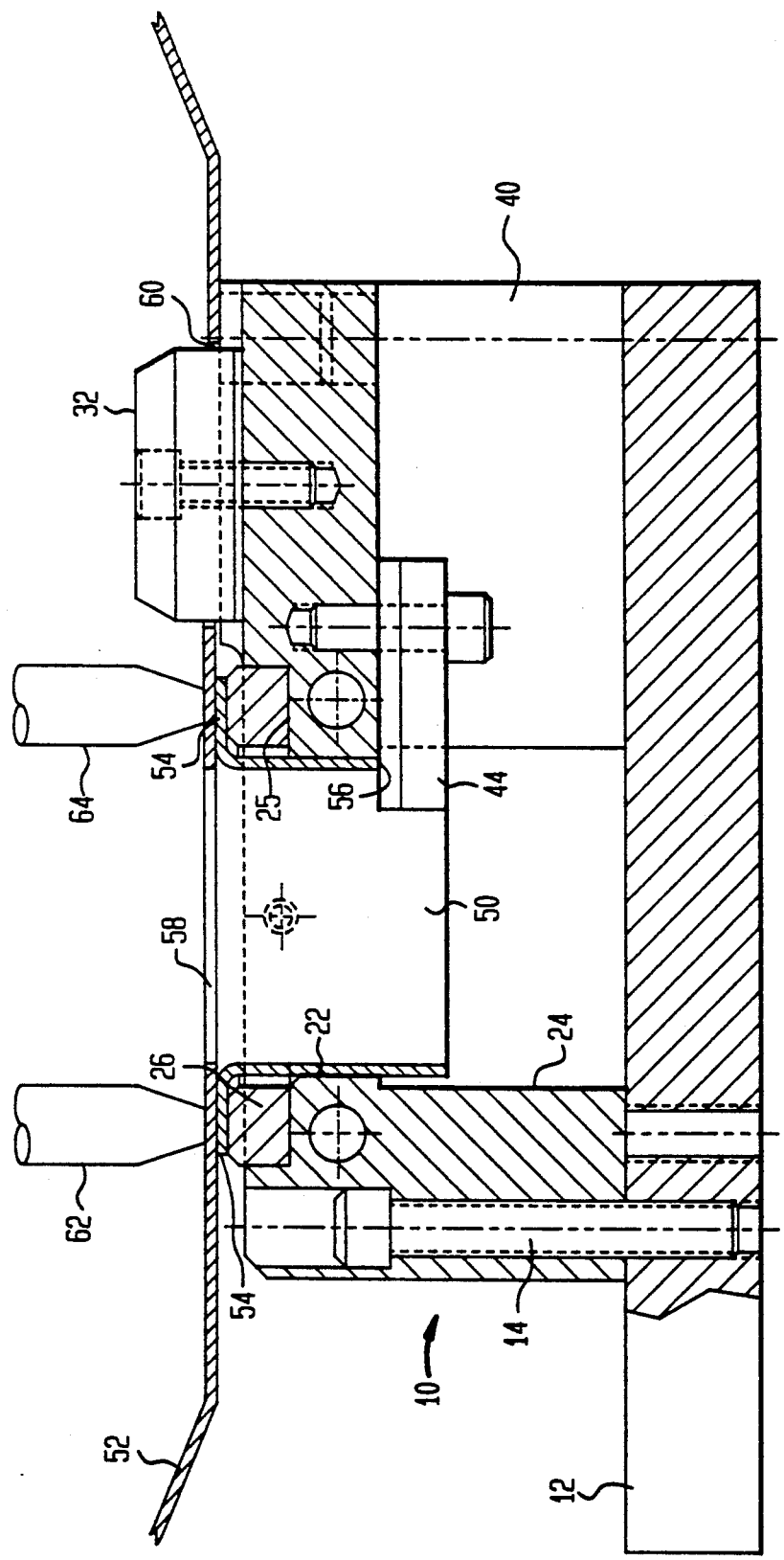
FIG. 3 is a view of the weld fixture according to the invention with workpiece in place and weld electrodes in weld position.

The use of the fixture is illustrated in FIG. 3 to weld together two sheet metal parts 50 and 52. Part 50 is a tube having a flange 54 at one end and a slot 56 in the other end. The tube 50 is inserted through the hole in the electrode 26 and through the intermediate bore portion 22 which contacts the tube to locate it. The flange 54 seats on the electrode 26 and the slot 56 aligns with the locator 44 to positively orient the tube in a desired position. The part 52 is a formed sheet which is placed over the flange 54 of the tube 50. The sheet 52 has an aperture 58 aligned with the axis of the tube 50 and has a rectangular slot 60 at one side of the aperture 58 which fits over the locator 32 to positively orient the sheet 52. Movable welding electrodes 62 and 64 of opposite polarity press the sheet 52 and flange 54 assembly against the fixed electrode 26.

Weld current is applied through the electrodes 62, 64 and flows from one electrode through the parts 50, 52 to the electrode 26 and back through the parts 52, 50 to the other electrode to make a spot weld at each electrode 62, 64. The current is unable to flow into the body 10 of the fixture because of the insulating coating on the body surface. That is, the fixed electrode 26 is insulated from the surface of shoulder 25 on which it is seated, and the locators 32 and 44 are insulated from the body, and the intermediate bore surface 22 is insulated from the tube 50 so that current cannot flow into the body 10 from the electrode 26 or from any part of the workpieces where they contact the fixture. Four movable electrodes, two of each polarity, may be used instead of two to make four welds simultaneously.

In practice, the excellent insulation has yielded greatly improved welds and less sparking as compared to fixture designs using a number of separate insulating parts. Further the reduced number of parts made the fixture easier to design and build. For the fixture described herein, incorporating this invention reduced the number of special details that had to be designed and built from 27 to 6. The equivalent prior fixture had 21 points that had to be insulated. The complex design presented opportunities for design errors which might lead to electrical shorts. The simplicity of the present design avoids such pitfalls. Moreover, the time for both design and build was reduced by 40% and the fixture weight was reduced by 50%.

The heat generated in the workpiece and in the fixed electrode 26 is readily conducted into the water cooled body 10 through the thin coating of aluminum oxide on the seating surface 25. In practice, the excellent cooling has resulted in exceptionally long life of the electrode 26 as compared to the old design using a plurality of insulating parts.

The particular fixture configuration described herein is exemplary only and the principles and method of fabrication are applicable to other welding fixtures. The parts being welded dictate, to a great extent, the design of the fixture. In any case, the fixture should be based on an aluminum body having a thin aluminum oxide coating formed thereon.

Figure 5:
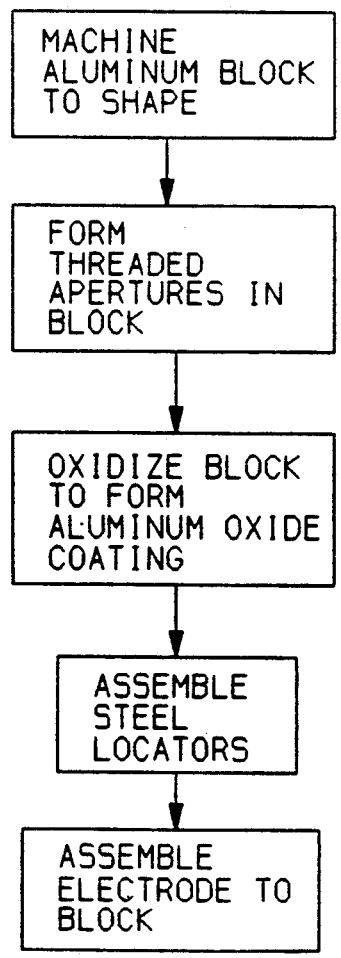
FIG. 5 is a flow chart showing method steps that are used in accordance with this invention.

The method steps for manufacturing the weld fixture are shown in the flow chart of FIG. 5. The steps include, machining block 10 to shape, forming threaded apertures in the block, oxidizing the bock to form an aluminum oxide coating, assembling steel locators and finally assembling an electrode to the block.

The embodiments of the invention in which an exclusive property or privilege is claimed are defined as follows:

1. A weld fixture for locating sheet metal workpieces with respect to movable spot weld electrodes, comprising:
    a conductive fixture body having an electrically insulating and thermally conductive coating over its surface,
    a conductive stationary electrode attached to the body in intimate thermal contact with the body and electrically insulated from the body by the insulating coating, and
    a plurality of conductive fasteners attached to the body and insulated from the body by the electrically insulating coating.

2. A weld fixture for spot welding sheet metal workpieces comprising;
    a conductive stationary electrode,
    an aluminum fixture body having a surface supporting the stationary electrode in direct contact therewith for good heat conduction and having apertures for mounting fasteners,
    locator means secured to the fixture body by at least one fastener,
    an electrically insulating and thermally conductive surface coating over the body including the said surface and the apertures,
    and a plurality of conductive fasteners in the apertures and electrically insulated from the body by the electrically insulating coating.

3. The invention as defined in claim 2 wherein the electrically insulating coating comprises aluminum oxide.

4. The invention as defined in claim 2 wherein the electrically insulating coating comprises aluminum oxide impregnated with polytetrafluoroethylene.

5. The method of making a weld fixture having an electrode and workpiece locators comprising the steps of:
    machining a block of aluminum to a shape for holding a workpiece and an electrode,
    forming threaded apertures in the block for fasteners,
    then oxidizing the block to form an aluminum oxide coating on all the block surfaces,
    assembling steel locators to the resultant insulated block by fasteners threaded into the apertures, and
    assembling an electrode to the insulated surface of the block.

6. The invention as defined in claim 5 wherein the aluminum oxide coating is porous and including the further step of impregnating the coating with polytetrafluoroethylene.

7. The invention as defined in claim 5 wherein the step of oxidizing the block to form an aluminum oxide coating on all the block surfaces comprises immersing the block in sulfuric acid.

8. The invention as defined in claim 7 wherein the step of immersing the block in sulfuric acid comprises immersing the block in pure sulfuric acid at a temperature of substantially 23 degrees Fahrenheit.

* * * * *